United States Patent
Kim et al.

(10) Patent No.: US 10,117,217 B2
(45) Date of Patent: Oct. 30, 2018

(54) METHOD AND APPARATUS FOR TRANSMITTING POSITIONING REFERENCE SIGNAL IN WIRELESS ACCESS SYSTEM SUPPORTING MACHINE TYPE COMMUNICATION

(71) Applicant: LG ELECTRONICS INC., Seoul (KR)

(72) Inventors: Bonghoe Kim, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/535,237

(22) PCT Filed: Dec. 11, 2015

(86) PCT No.: PCT/KR2015/013600
§ 371 (c)(1),
(2) Date: Jun. 12, 2017

(87) PCT Pub. No.: WO2016/093662
PCT Pub. Date: Jun. 16, 2016

(65) Prior Publication Data
US 2017/0374640 A1    Dec. 28, 2017

Related U.S. Application Data

(60) Provisional application No. 62/090,895, filed on Dec. 12, 2014.

(51) Int. Cl.
*H04W 64/00*    (2009.01)
*H04J 11/00*    (2006.01)

(52) U.S. Cl.
CPC ........ *H04W 64/003* (2013.01); *H04J 11/0073* (2013.01); *H04J 11/0076* (2013.01); *H04J 2011/0096* (2013.01)

(58) Field of Classification Search
CPC ................. H04W 64/00; H04W 64/003; H04J 2011/0096; H04J 11/0073; H04J 11/0076
See application file for complete search history.

(56) References Cited

U.S. PATENT DOCUMENTS

2014/0301268 A1* 10/2014 Xu ..................... H04W 24/02
                                                              370/312
2017/0339660 A1* 11/2017 Kazmi ................. H04B 17/309

FOREIGN PATENT DOCUMENTS

WO    WO 2010/126280 A2    11/2010
WO    WO 2012/027028 A1    3/2012
(Continued)

OTHER PUBLICATIONS

ZTE: "Discussion on Traffic Channel Coverage Improvement", 3GPP TSG RAN WG1 Meeting #74bis, Oct. 2013 (Year: 2013).*
(Continued)

*Primary Examiner* — Mehmood B. Khan
(74) *Attorney, Agent, or Firm* — Birch, Stewart, Kolasch & Birch, LLP

(57) ABSTRACT

The present invention provides methods for configuring and transmitting a positioning reference signal (PRS) used for estimating the location of a machine type communication (MTC) terminal in a wireless access system supporting machine type communication (MTC), and an apparatus for supporting the same. According to one embodiment of the present invention, a method for transmitting, by a base station, a positioning reference signal (PRS) used for estimating the location of a machine type communication (MTC) terminal in a wireless access system supporting MTC, comprises the steps of: repeating transmission of a physical downlink shared channel (PDSCH) including the same downlink data N times; and transmitting the PRS in a PRS subframe (SF), wherein when the PRS SF consists of a normal subframe (SF) and a multimedia broadcast multi-
(Continued)

cast service single frequency network (MBSFN) SF, a normal cyclic prefix (CP) is used as a CP to be applied to the PRS, and when the PRS SF consists of only the MBSFN SF, a CP applied to the PRS may be an extended CP.

10 Claims, 18 Drawing Sheets

(56) References Cited

FOREIGN PATENT DOCUMENTS

| | | | |
|---|---|---|---|
| WO | WO-2012027028 A1 * | 3/2012 | ........... H04L 5/0048 |
| WO | WO 2014/182105 A1 | 11/2014 | |

OTHER PUBLICATIONS

ZTE, "Discussion on Traffic Channel Coverage Improvement," 3GPP TSG RAN WG1 Meeting #74bis, R1-134304, Guangzhou, China, Oct. 7-11, 2013, 6 pages.

* cited by examiner

FIG. 8
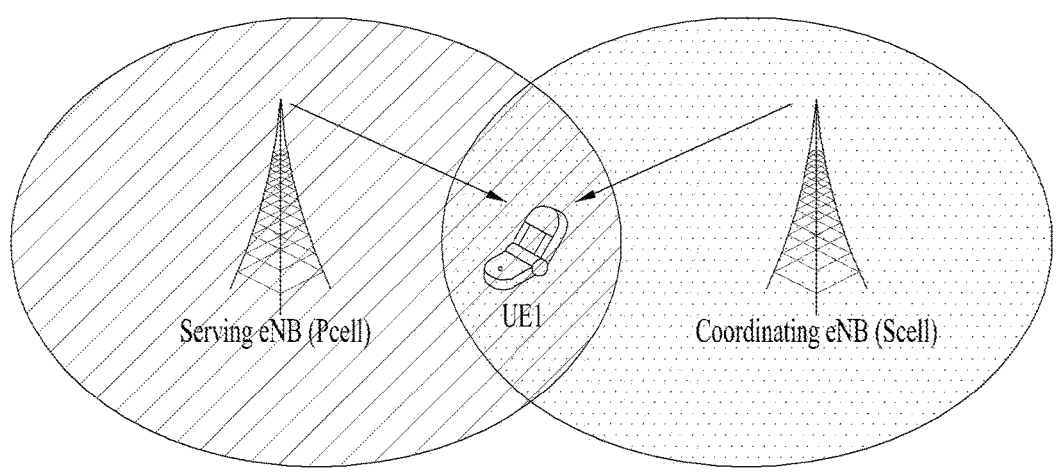
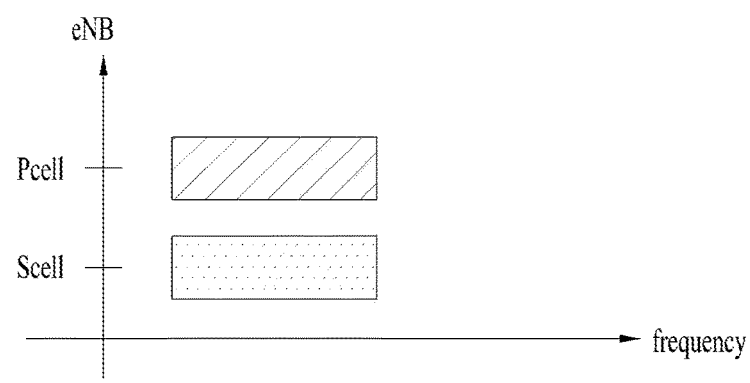

FIG. 9
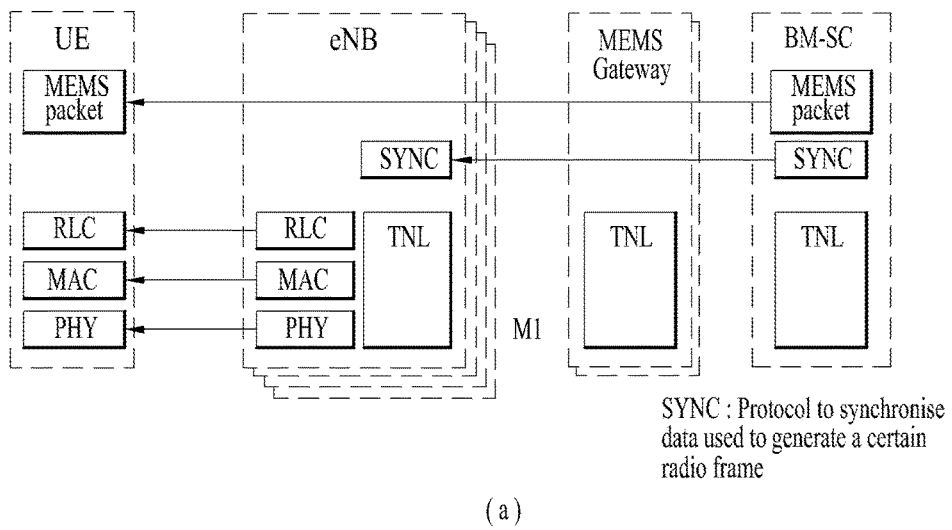
(a)
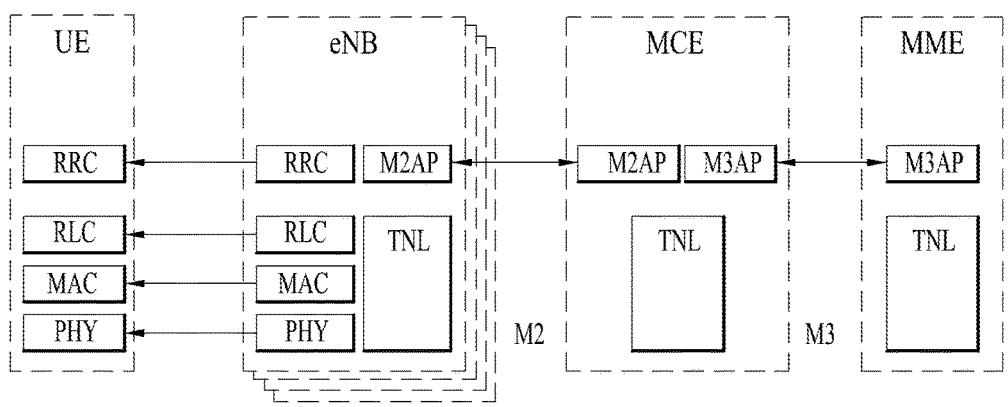
(b)

FIG. 17

| Normal SF | | | MBSFN SF | | | Normal SF | |
|---|---|---|---|---|---|---|---|
| PDSCH (RV0) | PDSCH (RV2) | PDSCH (RV3) | | | | PDSCH (RV1) | PDSCH (RV0) |

- PRS Transmission
- PDSCH Transmission X (a)

| Normal SF | | | MBSFN SF | | | Normal SF | |
|---|---|---|---|---|---|---|---|
| PDSCH (RV0) | PDSCH (RV2) | PDSCH (RV3) | (RV1) | (RV0) | (RV2) | PDSCH (RV3) | PDSCH (RV1) |

- PRS Transmission
- PDSCH Transmission X (b)

| Normal SF | | | MBSFN SF | | | Normal SF | |
|---|---|---|---|---|---|---|---|
| PDSCH (RV0) | PDSCH (RV2) | PDSCH (RV2) | | | | PDSCH (RV2) | PDSCH (RV3) |

- PRS Transmission
- PDSCH Transmission X (c)

METHOD AND APPARATUS FOR TRANSMITTING POSITIONING REFERENCE SIGNAL IN WIRELESS ACCESS SYSTEM SUPPORTING MACHINE TYPE COMMUNICATION

CROSS REFERENCE TO RELATED APPLICATIONS

This application is the National Phase of PCT International Application No. PCT/KR2015/013600, filed on Dec. 11, 2015, which claims priority under 35 U.S.C. 119(e) to U.S. Provisional Application No. 62/090,895, filed on Dec. 12, 2014, all of which are hereby expressly incorporated by reference into the present application.

TECHNICAL FIELD

The present disclosure relates to a wireless access system supporting Machine Type Communication (MTC), and more particularly, to methods and apparatuses for configuring and transmitting a Positioning Reference Signal (PRS) by which to estimate the location of an MTC terminal. The present disclosure also relates to a method for repeatedly transmitting downlink data to an MTC terminal, when a PRS is transmitted.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

Several position measurement methods have already been used and as examples of the position measurement methods, included are an Assisted Global Navigation Satellite System (A-GNSS) scheme, an Enhanced Cell-ID (E-CID) scheme, a Uplink Time Difference Of Arrival (UTDOA) scheme, etc. Such a method for measuring a position of a user equipment has been used to provide a user with various location-based services (e.g., advertisement, position tracking, emergency communication means, and the like).

However, although the conventional position measurement methods can be commonly applied to outdoor/indoor environments, typical position measurement accuracy is significantly low.

For instance, in the case of the E-CID scheme, its position measurement accuracy is estimated as 50 m in a Line Of Sight (LOS) environment and 150 m in a Non-LOS (NLOS) environment. In addition, an OTDOA scheme, which is based on a PRS, has a limitation in that positing measurement error may exceed 100 m due to evolved Node B (eNB) synchronization error, multipath propagation error, User Equipment (UE)'s Reference Signal Time Difference (RSTD) measurement quantization error, timing offset estimation error, etc. Moreover, in the case of the A-GNSS scheme, since a GNSS receiver is required, it also has a limitation in that implementation complexity and battery consumption is increased.

That is, although the $3^{rd}$ Generation Partnership Project (3GPP) Universal Terrestrial Radio Access (UTRA) and Evolved-UTRA (E-UTRA) standards have already supported these position measurement methods, the legacy position measurement methods are not viable for an MTC terminal which is likely to be placed in a relatively poor environment.

DISCLOSURE

Technical Problem

An aspect of the present disclosure is to provide a method for more accurately measuring the location of a User Equipment (UE).

Another aspect of the present disclosure is to provide a method for measuring the location of a Machine Type Communication (MTC) UE.

Another aspect of the present disclosure is to provide a method for transmitting a Positioning Reference Signal (PRS) to an MTC UE, and methods for transmitting downlink data during PRS transmission.

Another aspect of the present disclosure is to provide apparatuses supporting the above methods.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides methods for configuring and transmitting a Positioning Reference Signal (PRS) by which to estimate the location of a Machine Type Communication (MTC) terminal, methods for repeatedly transmitting downlink data to an MTC terminal, when a PRS is transmitted, and apparatuses supporting the methods.

In an aspect of the present disclosure, a method for transmitting a PRS for estimating the location of an MTC UE by a Base Station (BS) in a wireless access system supporting MTC includes repeatedly transmitting a Physical Downlink Shared Channel (PDSCH) including the same downlink data, N times, and transmitting the PRS in PRS Subframes (SFs). If the PRS SFs include a normal SF and a Multimedia Broadcast multicast service Single Frequency Network (MBSFN) SF, a normal Cyclic Prefix (CP) is applied to the PRS, and if the PRS SFs include only MBSFN SFs, an extended CP is applied to the PRS.

The method may further include transmitting PRS SF information. The PRS SF information may indicate SFs configured as the PRS SFs.

In another aspect of the present disclosure, a BS for transmitting a PRS for estimating the location of an MTC UE n a wireless access system supporting MTC includes a transmitter, and a processor configured to support PRS transmission by controlling the transmitter. The processor is configured to repeatedly transmit a PDSCH including the same downlink data, N times, and transmit the PRS in PRS SFs. If the PRS SFs include a normal SF and an MBSFN SF, a normal CP is applied to the PRS, and if the PRS SFs include only MBSFN SFs, an extended CP is applied to the PRS.

The processor may be configured to transmit PRS SF information by controlling the transmitter, and the PRS SF information may indicate SFs configured as the PRS SFs.

The repeatedly transmitted PDSCH may not be transmitted in the MBSFN SF.

The Redundancy Versions (RVs) of the PDSCH transmitted repeatedly N times may not be counted for the MBSFN SF, if the PDSCH is not transmitted in the MBSFN SF.

Or the RVs of the PDSCH transmitted repeatedly N times may be counted, on the assumption that the PDSCH is transmitted in the MBSFN SF.

The repeatedly transmitted PDSCH may also be transmitted in the MBSFN SF.

Then, the PDSCH may be transmitted based on a Demodulation Reference Signal (DM-RS) specific to the MTC UE in the MBSFN SF, and the PDSCH may be transmitted based on a Cell-specific Reference Signal (CRS) specific to the BS in the normal SF.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

First, as a Machine Type Communication (MTC) User Equipment (UE) performs measurement based on a Positioning Reference Signal (PRS) received in a PRS Subframe (SF), a Base Station (BS) or a network entity may accurately measure the location of the MTC UE.

Secondly, when a PRS is transmitted to an MTC UE, transmission efficiency may be increased or the influence of an error may be minimized, by use of a method for counting the Redundancy Versions (RVs) of repeated transmissions of a Physical Downlink Shared Channel (PDSCH).

Thirdly, when a PRS directed to an MTC UE is transmitted in a Multicast Broadcast multicast service Single Frequency Network (MBSFN) SF, a Cyclic Prefix (CP) length is configured accurately, so that a PDSCH may also be transmitted repeatedly in an MBSFN SF.

It will be apparent to those skilled in the art that various modifications and variations can be made in the present disclosure without departing from the technical features or scope of the disclosures. Thus, it is intended that the present disclosure covers the modifications and variations of this disclosure provided they come within the scope of the appended claims and their equivalents.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 8 is a conceptual view of a Coordinated Multi-Point (CoMP) system operating in a CA environment;

FIG. 9 illustrates the architecture of a user plane and a control plane, for supporting Multimedia Broadcast and Multicast Service (MBMS);

FIG. 17 is a view illustrating a method for setting Redundancy Versions (RVs), when a Physical Downlink Shared Channel (PDSCH) is repeatedly transmitted to a Machine Type Communication (MTC) UE;

BEST MODE FOR CARRYING OUT THE INVENTION

Figure 1:
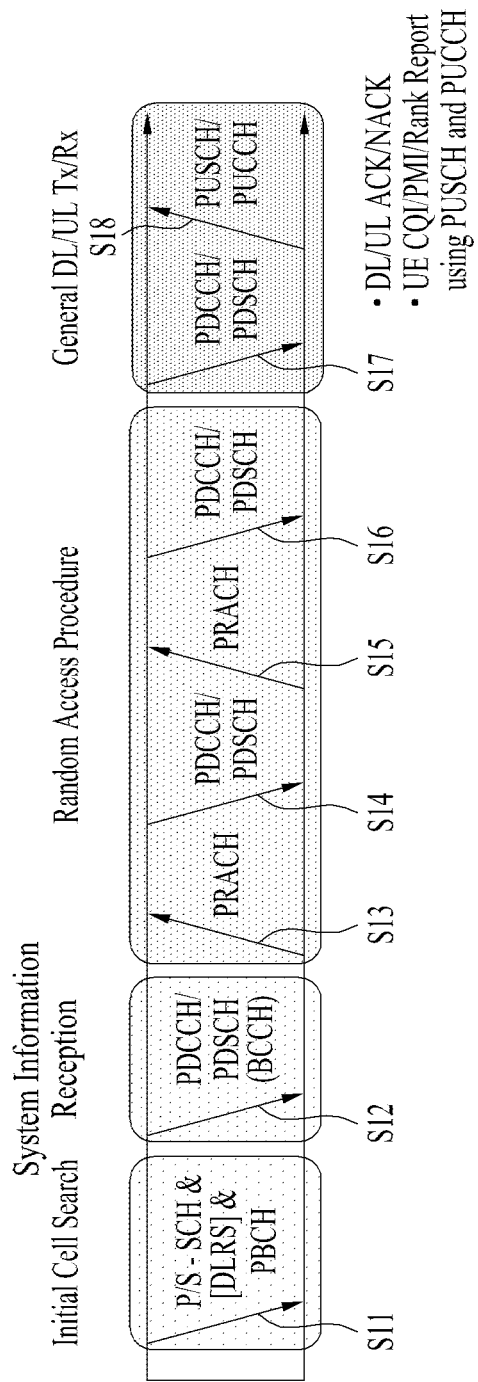
FIG. 1 is a view illustrating physical channels and a signal transmission method using the physical channels.

Embodiments of the present disclosure as described below in detail provide a method and apparatus for using a heterogeneous network signal to measure the location of a User Equipment (UE).

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
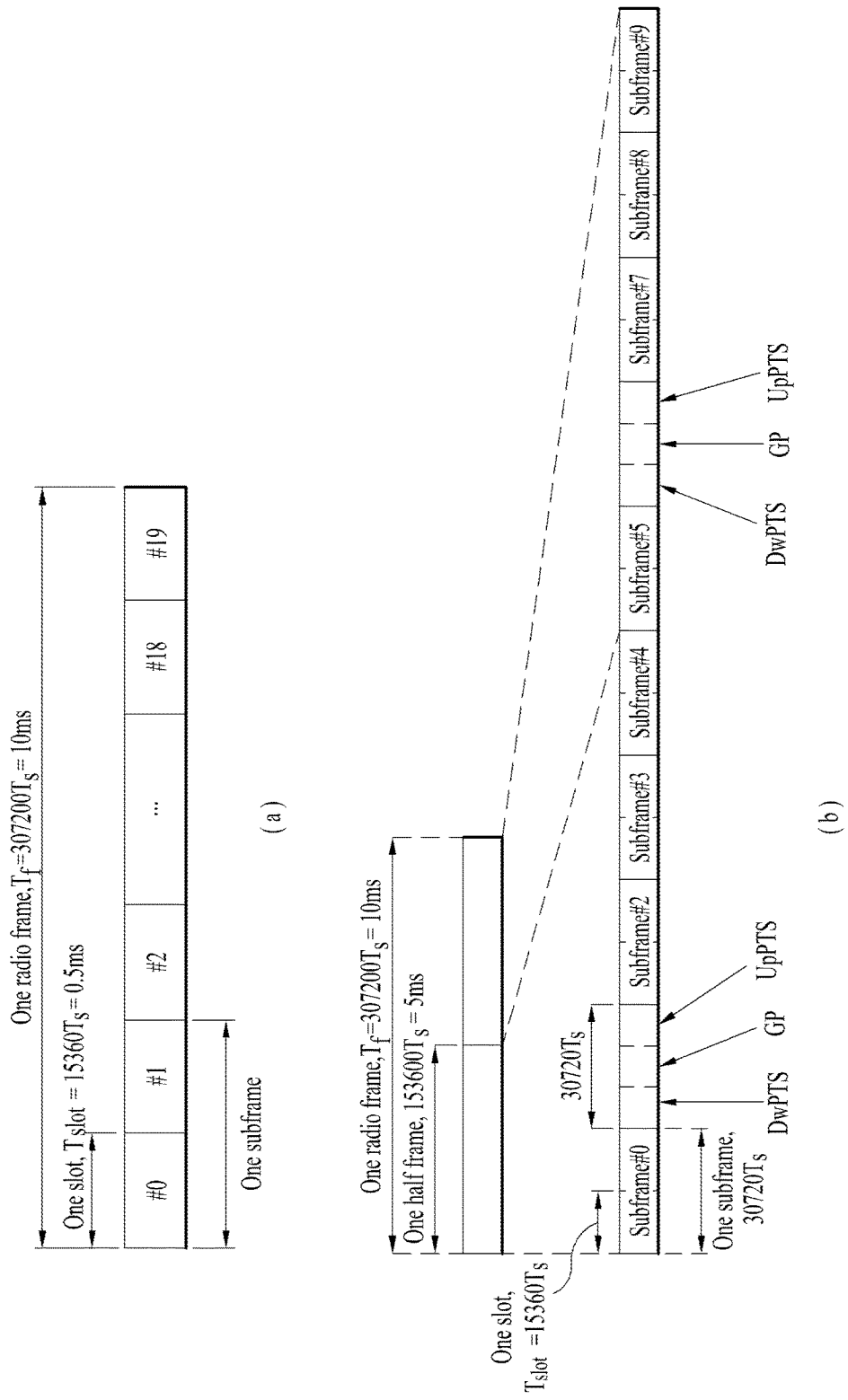
FIG. 2 is a view illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

FIG. 2(b) illustrates frame structure type 2. Frame structure type 2 is applied to a Time Division Duplex (TDD) system. One radio frame is 10 ms ($Tf=307200 \cdot T_s$) long, including two half-frames each having a length of 5 ms ($=153600 \cdot T_s$) long. Each half-frame includes five subframes each being 1 ms ($=30720 \cdot T_s$) long. An ith subframe includes 2ith and (2i+1)th slots each having a length of 0.5 ms ($Tslot=15360 \cdot T_s$). Ts is a sampling time given as $T_s=1/(15 kHz \times 2048)=3.2552 \times 10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

One radio frame is 10 ms ($Tf=307200 \cdot T_s$) long, including equal-sized 20 slots indexed from 0 to 19. Each slot is 0.5 ms ($Tslot=15360 \cdot T_s$) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as $T_s=1/(15 kHz \times 2048)=3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

Figure 3:
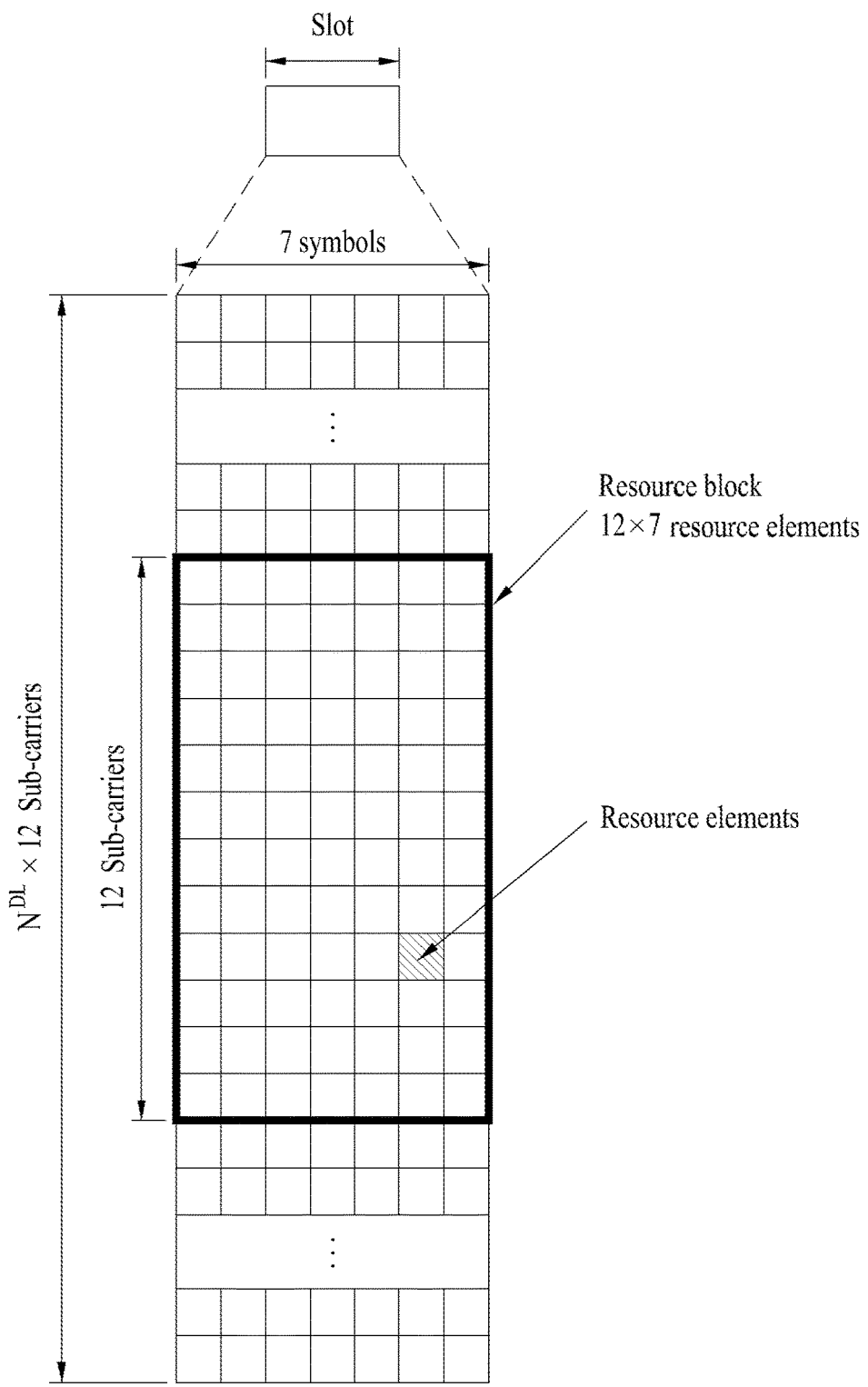
FIG. 3 is a view illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
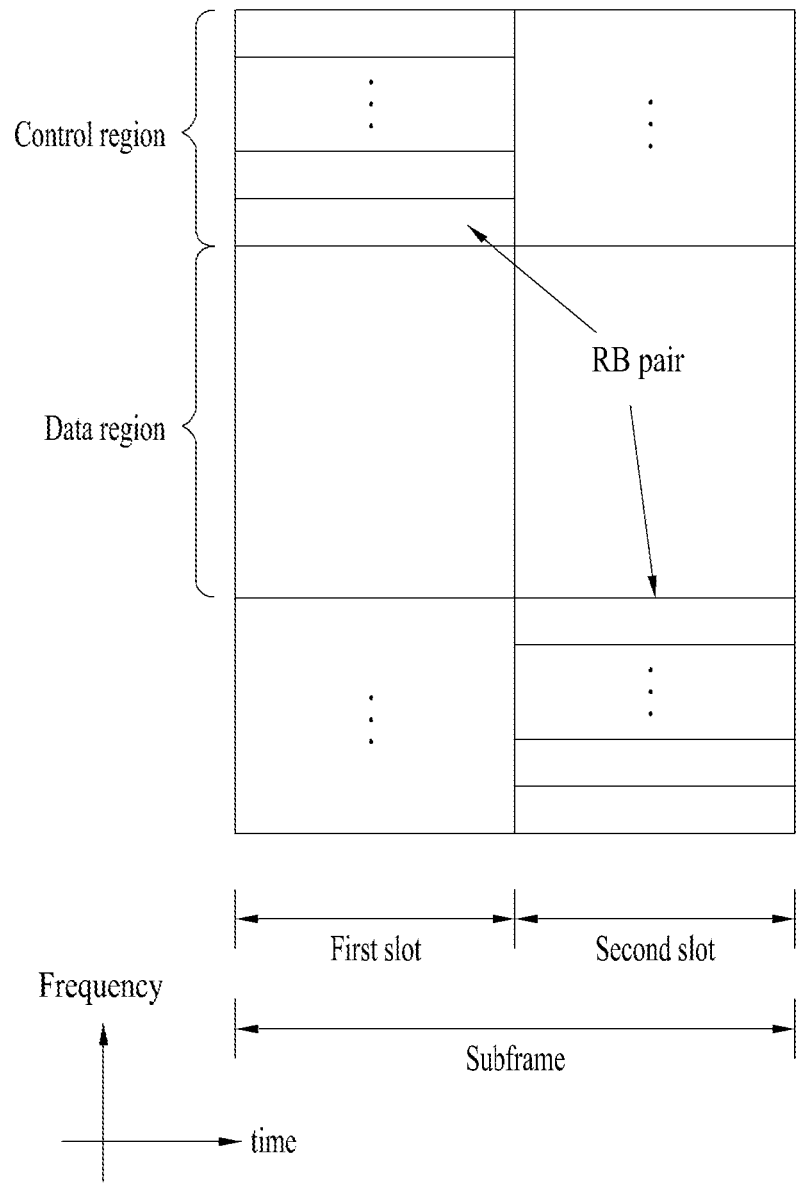
FIG. 4 is a view illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
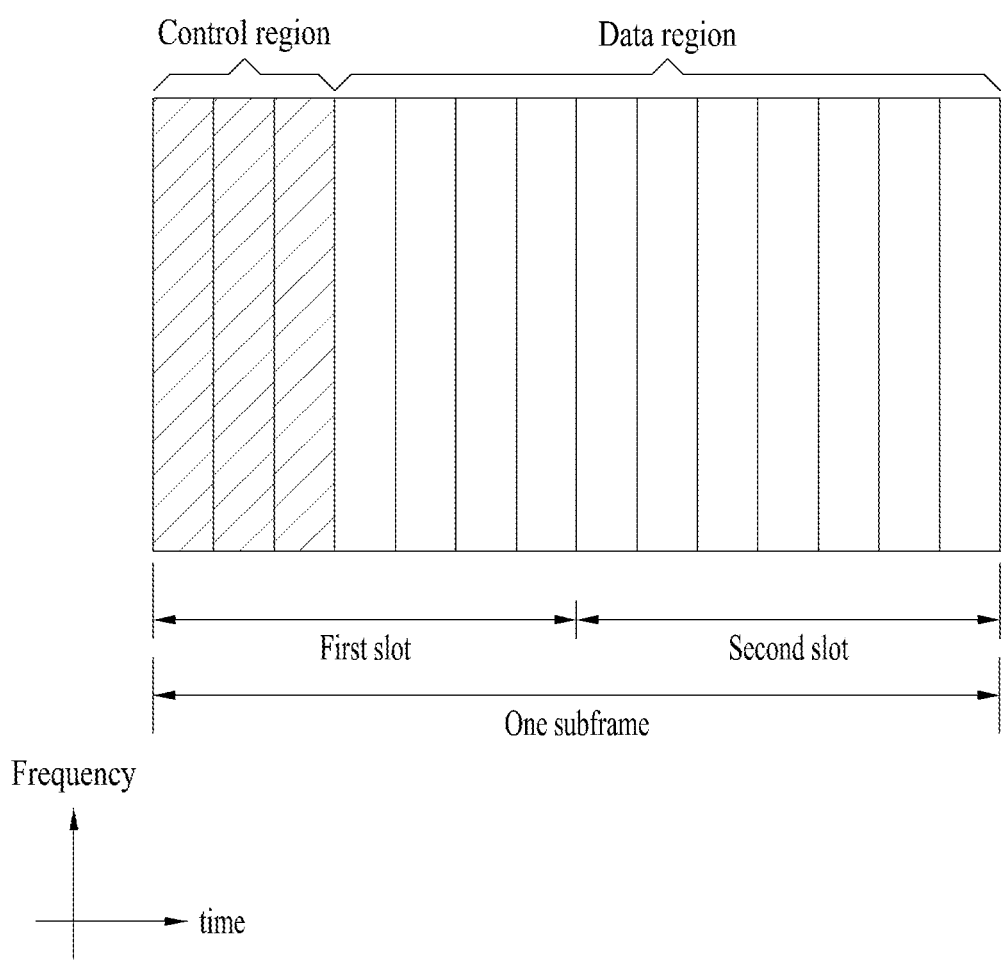
FIG. 5 is a view illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Physical Downlink Control Channel (PDCCH)

1.2.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by NREG. Then the number of CCEs available to the system is NCCE $(=\lfloor N_{REG}/9 \rfloor)$ and the CCEs are indexed from 0 to NCCE-1.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCE (n) | Number of REG | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for PUSCH transmissions (uplink) |
| Format 1 | Resource assignments for single codeword PDSCH transmission (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g., paging/broadcast system information) |
| Format 1D | Compact resource assignments for PDSCH using multi-user MIMO(mode 5) |
| Format 2 | Resource assignments for PDSCH for closed loop MIMO operation (mode 4) |

TABLE 3-continued

| DCI Format | Description |
|---|---|
| Format 2A | resource assignments for PDSCH for open loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:
 (1) Transmission mode 1: Single antenna port (port 0);
 (2) Transmission mode 2: Transmit diversity;
 (3) Transmission mode 3: Open-loop spatial multiplexing when the number of layer is larger than 1 or Transmit diversity when the rank is 1;
 (4) Transmission mode 4: Closed-loop spatial multiplexing;
 (5) Transmission mode 5: MU-MIMO;
 (6) Transmission mode 6: Closed-loop rank-1 precoding;
 (7) Transmission mode 7: Precoding supporting a single layer transmission, which is not based on a codebook (Rel-8);
 (8) Transmission mode 8: Precoding supporting up to two layers, which are not based on a codebook (Rel-9);
 (9) Transmission mode 9: Precoding supporting up to eight layers, which are not based on a codebook (Rel-10); and
 (10) Transmission mode 10: Precoding supporting up to eight layers, which are not based on a codebook, used for CoMP (Rd-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then, the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE $N_{CCE,k}-1$. $N_{CCE,k}$ is the total number of CCEs in the control region of a kth subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 4] illustrates the sizes of CSSs and USSs.

TABLE 4

| PDCCH Format | Number of CCE (n) | Number of candidates in CSS | Number of candidates in USS |
|---|---|---|---|
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1,2,4,8\}$. The CCEs of PDCCH candidate set m in the SS may be determined by the following equation.

$$L \cdot \{(Y_k + m) \bmod \lfloor N_{CCE,k}/L \rfloor\} + i \qquad \text{[Equation 1]}$$

Herein, $M^{(L)}$ is the number of PDCCH candidates with CCE aggregation level L to be monitored in the SS, $m=0, \ldots, M^{(L)}-1$, is the index of a CCE in each PDCCH candidate, and $i=0, \ldots, L-1$, $k=\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k = (A \cdot Y_{k-1}) \bmod D \qquad \text{[Equation 2]}$$

Herein, $Y_{-1} = n_{RNTI} \neq 0$, $n_{RNTI}$ indicating an RNTI value. A=39827 and D=65537.

1.3 Carrier Aggregation (CA) Environment
1.3.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 6:
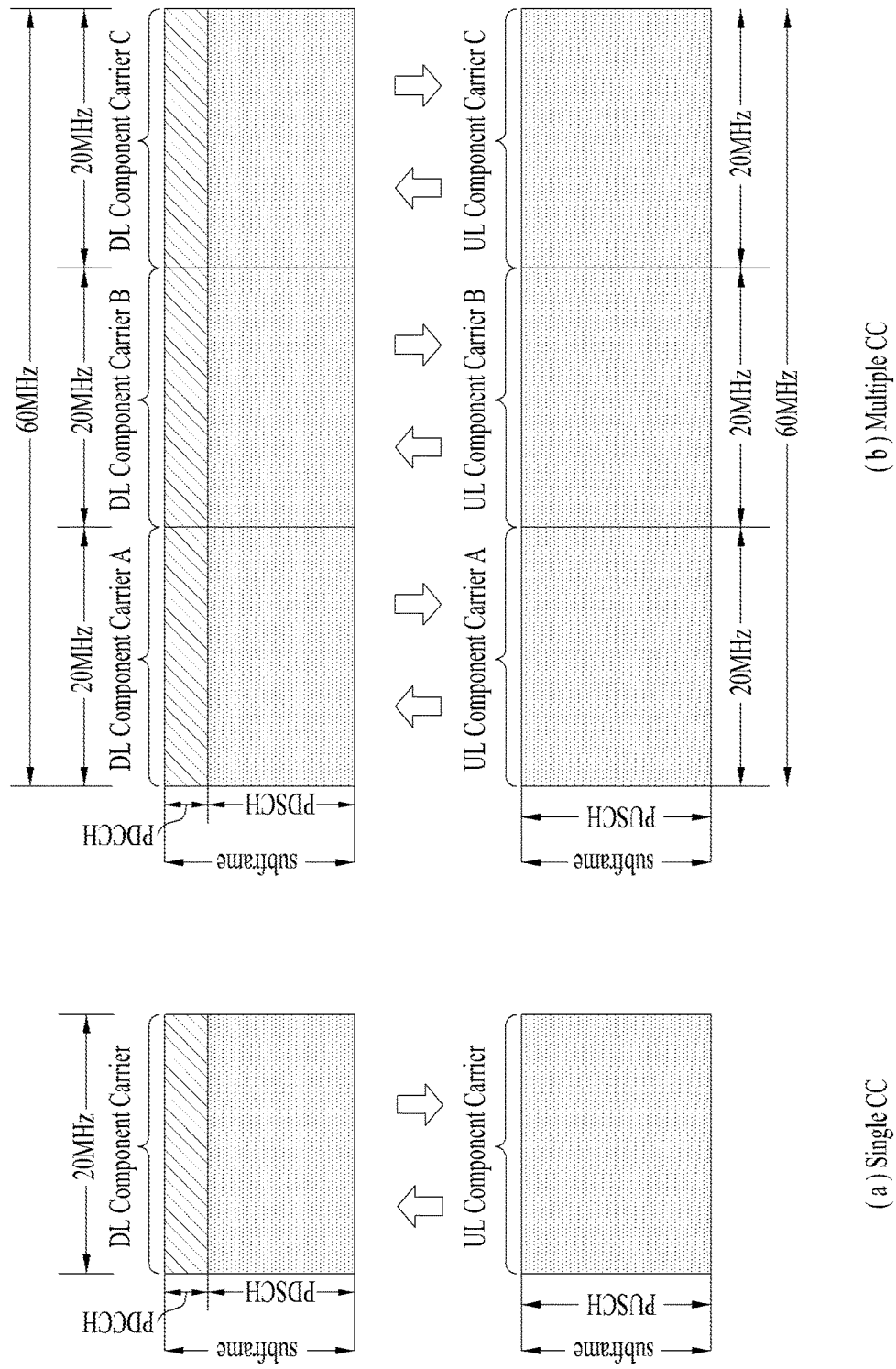
FIG. 6 is a view illustrating an example of Component Carriers (CCs) and Carrier Aggregation (CA) in a Long Term Evolution-Advanced (LTE-A) system.

FIG. 6 illustrates an example of CCs and CA in the LTE-A system, which are used in embodiments of the present disclosure.

FIG. 6(a) illustrates a single carrier structure in the LTE system. There are a DL CC and a UL CC and one CC may have a frequency range of 20 MHz.

FIG. 6(b) illustrates a CA structure in the LTE-A system. In the illustrated case of FIG. 6(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

1.3.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 7:
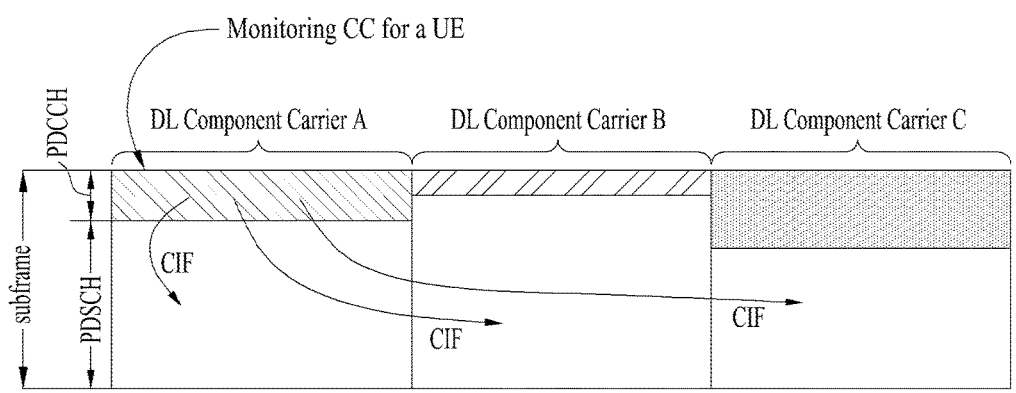
FIG. 7 is a view illustrating a subframe structure based on cross-carrier scheduling in the LTE-A system.

FIG. 7 illustrates a cross carrier-scheduled subframe structure in the LTE-A system, which is used in embodiments of the present disclosure.

Referring to FIG. 7, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC and DL CC 'C' that are not configured as PDCCH monitoring DL CCs.

1.3.3 CA Environment-Based CoMP Operation

Hereinafter, a cooperation multi-point (CoMP) transmission operation applicable to the embodiments of the present disclosure will be described.

In the LTE-A system, CoMP transmission may be implemented using a carrier aggregation (CA) function in the LTE. FIG. 8 is a conceptual view illustrating a CoMP system operating based on a CA environment.

In FIG. 8, it is assumed that a carrier operated as a PCell and a carrier operated as an SCell may use the same frequency band on a frequency axis and are allocated to two eNBs geographically spaced apart from each other. At this time, a serving eNB of UE1 may be allocated to the PCell, and a neighboring cell causing much interference may be allocated to the SCell. That is, the eNB of the PCell and the eNB of the SCell may perform various DL/UL CoMP operations such as joint transmission (JT), CS/CB and dynamic cell selection for one UE.

FIG. 8 illustrates an example that cells managed by two eNBs are aggregated as PCell and SCell with respect to one UE (e.g., UE1). However, as another example, three or more cells may be aggregated. For example, some cells of three or more cells may be configured to perform CoMP operation for one UE in the same frequency band, and the other cells may be configured to perform simple CA operation in different frequency bands. At this time, the PCell does not always need to participate in CoMP operation.

1.4 Multimedia Broadcast and Multicast Service (MBMS)

1.4.1 MBMS Structure

MBMS supports both multicast/broadcast service and unicast service over a single network by supporting the multicast/broadcast service in a cellular system. In MBMS, the same content is transmitted to a plurality of users located in a specific area known as an MBMS service area including a plurality of cells. Each of cells participating in MBMS transmission configures point-to-multipoint radio resources and all users that have subscribed to MBMS receive the same transmission signal. There is no need for tracking the movement of users in a wireless access network and the users may receive content without any specific notification to the network.

FIG. 9 illustrates the architecture of a user plane and a control plane for supporting MBMS.

FIG. 9(a) illustrates the structure of a user plane for supporting MBMS. A Broadcast Multicast Service Center (BM-SC) located in a core network authenticates a content provider, performs billing, and establishes an overall data flow that passes through the core network. An MBMS gateway is a logical node for multicasting Internet Protocol (IP) packets received from the BM-SC to all eNBs participating in transmission within a Multimedia Broadcast multicast service Single Frequency Network (MBSFN) area.

An MBSFN area refers to a specific area in which one or more cells transmit the same content. One MBSFN area may cover a plurality of cells and one cell may belong to a plurality of (up to 8) MBSFN areas. From the perspective of MBSFN reception at a UE, individual cells are not distinguished from each other and an MBSFN area is statically determined.

FIG. 9(b) illustrates the structure of a control plane for supporting MBMS. For MBSFN transmission, time synchronization is required between cells within an MBSFN area and the cells preferably use the same radio resources for a specific service. A Multi-cell/Multicast Coordination Entity (MCE) performs such synchronization and coordinates radio resources. The MCE may control a plurality of eNBs within the MBSFN area. Also, the MCE may process session control signaling through a Mobility Management Entity (MME).

1.4.2. MBMS Operation

A UE is capable of MBMS reception in idle state (e.g., RRC_IDLE state) and/or connected state (e.g., RRC_CONNECTED state). To provide MBMS, the LTE/LTE-A system defines various DL channels.

For example, a Physical Multicast Channel (PMCH) is defined for use at the physical layer, a Multicast Channel (MCH) is defined as a transport channel, and a Multicast Control Channel (MCCH) and a Multicast Traffic Channel (MTCH) are defined as logical channels.

The MCCH is used to transmit control information for providing MBMS, and the MTCH is used to transmit data for providing MBMS. The MCCH and the MTCH may be mapped to the PMCH which is one of physical channels and then to be transmitted. As a UE receives an MCCH including scheduling information for an MTCH, the UE may receive and demodulate the MTCH.

To support MBMS, an idle-state UE may perform the following operation.

(1) A UE-specific DRX is configured and mobility is managed by a higher layer.

(2) The UE monitors a paging channel in order to detect an incoming call, a change of system information, an Earthquake and Tsunami Warning System (ETWS) notification if the UE is ETWS-enabled, and a Commercial Mobile Alert Service (CMAS) notification if the UE is CMAS-enabled.

(3) The UE may perform neighbor cell measurement and cell reselection.

(4) The UE may acquire system information.

(5) The UE may log possible measurements including locations and time.

To support MBMS, a connected-state UE may perform the following operation.

(1) The UE may transmit and receive unicast data.

(2) A UE-specific DRX may be configured for the UE at a lower layer.

(3) If the UE supports CA, the UE may use one or more SCells linked to a PCell in order to extend a bandwidth.

(4) The network may manage the mobility of the UE, for handover, a cell measurement command, etc.

(5) The UE monitors a paging channel and/or SIB1 in order to detect a change of system information, an ETWS notification if the UE is ETWS-enabled, and a CMAS notification if the UE is CMAS-enabled.

(6) The UE monitors a control channel to determine whether data has been scheduled on a shared data channel.

(7) The UE measures and feeds back channel quality, measures neighbor cells, and reports the neighbor cell measurements. In addition, the UE may acquire system information.

A logical channel for transmitting MBMS control information, MCCH has the following features.

(1) One MBSFN area is related to one MCCH and one MCCH corresponds to one MBSFN area. The MCCH is transmitted on a (P)MCH.

(2) An MCCH may include one MBSFN area configuration RRC message with a list of all MBMS services of connected sessions and optionally, an MBMSCountingRequest message.

(3) The MCCH is transmitted in all cells except for MBMS area-reserved cells within the MBSFN area.

(4) The MCCH may be transmitted in every MCCH repetition period by RRC signaling and may have a modification period.

(5) A notification mechanism may be used for the MCCH to notify a change in MCCH information due to session start or the presence of an MBMS counting request message.

1.4.2.1 MBMS Scheduling

MCCH information is transmitted periodically according to a configurable repetition period. Scheduling information is not provided for the MCCH. That is, a lower-layer configuration (e.g., a MAC-layer configuration) as well as time-domain scheduling is provided semi-statically as defined by an SIB13 message.

The E-UTRAN periodically provides MCH Scheduling Information (MSI) for MBMS user data transmitted on the logical channel, MTCH, through the lower layer (i.e., the MAC layer). The MCH information is related only to time-domain scheduling. That is, frequency-domain scheduling and a lower-layer configuration are provided semi-statically. The periodicity of the MSI is configurable and defined by an MCS scheduling period.

1.4.2.2 MCCH Information Validity and Change Notification

Figure 10:
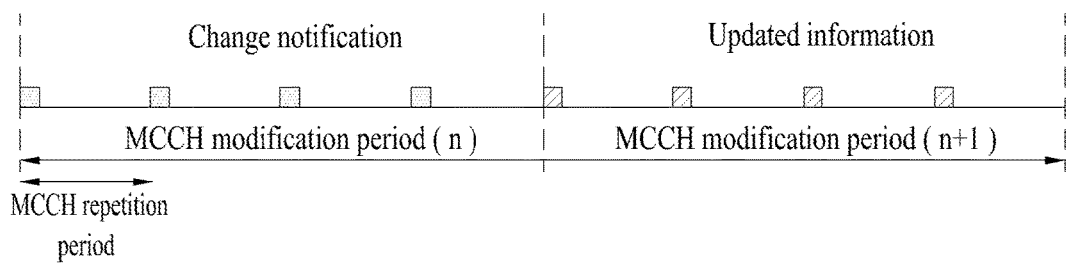
FIG. 10 illustrates a change notification mechanism for notifying a change of Multicast Control Channel (MCCH) information.

FIG. 10 illustrates a change notification mechanism for notifying a change of MCCH information.

The change notification mechanism may be used to notify a change in MCCH information caused by the start of a session or the presence of an MBMSCountingRequest message. Referring to FIG. 10, when MCCH information has been changed, a process for notifying the change to a UE may be depicted. MCCH information is changed only in specific radio frames. The same MCCH information may be transmitted a plurality of times within a modification period.

The UE may monitor one or more notification subframes in every modification period. Upon receipt of a change notification, the UE may acquire an MCCH at the boundary of the next modification period. The UE may detect an MCCH change which has not been notified by the MCCH monitoring-based notification mechanism, during a modification period.

Modification period boundaries may be defined by SFNs satisfying SFN mod m=0. Herein, m is the number of radio frames included in a modification period. The modification period may be indicated by an SIB13 message.

Referring to FIG. 10, if the network is to change MCCH information, the network notifies UEs of the change in a first modification period. The network may transmit updated MCCH information in the next modification period (i.e., a second modification period). Upon receipt of the change notification, a UE interested in MBMS may immediately receive the new MCCH information in the next modification period.

To indicate a change in MCCH information to an idle-state or connected-state UE, an MBMS-specific RNTI (M-RNTI) may be used on a PDCCH. MCCH information change notifications on the PDCCH may be transmitted periodically only in MBSFN subframes. That is, a change notification is transmitted periodically in MBSFN subframes in every modification period before an MCCH modification. DCI format 1C including an M-RNTI is used for such a notification and includes an 8-bit bitmap to indicate one or more MBSFN areas to which an MCCH change has occurred.

1.4.2.3 MCCH Information Acquisition

Figure 11:
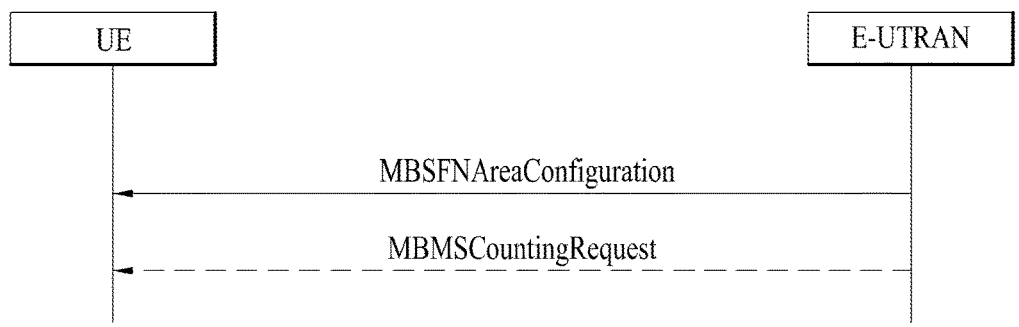
FIG. 11 is a diagram illustrating a signal flow for a procedure for acquiring MCCH information by a User Equipment (UE)

FIG. 11 illustrates a procedure for acquiring MCCH information by a UE.

The UE may perform the MCCH information acquisition procedure illustrated in FIG. 11 in order to acquire MBMS control information broadcast by the E-UTRAN. For example, if a UE, which wants to receive MBMS, enters an MBSFN area or receives a notification indicating a change in MCCH information, the UE may start the MCCH information acquisition procedure. A UE that is receiving MBMS may also perform the MCCH information acquisition procedure.

That is, the E-UTRAN including one or more eNBs transmits an MBSFNAreaConfiguration message at the RRC layer to the UE in order to transmit MCCH information. As described before, the MBSFNAreaConfiguration message and/or the MBSFNCountingRequest message may be mapped to a logical channel MCCH, for transmission, and the MCCH may be mapped to a physical channel PMCCH, for transmission.

The MBSFNAreaConfiguration message includes MBMS control information applicable to an MBSFN area and the E-UTRAN configures an MCCH for each MBSFN area. That is, an MCCH identifies an MBSFN area.

The MBSFNAreaConfiguration message includes a pmchInfoList Information Element (IE) as MBMS control information. The pmchInfoList IE may include a dataMCS field to define MCS information for a subframe carrying a PMCH. The dataMCS field may indicate whether 256QAM is supported for the PMCH and may indicate IMCS indicating an MCS.

Upon receipt of the MBMSCountingRequest message, a UE may perform an MBMS counting procedure. The MBMS counting procedure is used to calculate the number of UEs that the E-UTRAN receives through an MRB or that want to receive a specific MBMS service through an MRB in RRC_CONNECTED state.

1.4.2.4 System Information Block (SIB) Message

In embodiments of the present invention, SIB messages related to MBMS are SIB13 and SIB15. SIB13 includes information needed to acquire MBMS control information related to one or more MBSFN areas, and SIB15 includes MBMS Service Area Identities (SAIs) for current and/or neighbor carrier frequencies.

For a description of SIB13 and SIB15, refer to TS 36.331 v12.2.

1.5 Cell-Specific Reference Signal

Figure 12:
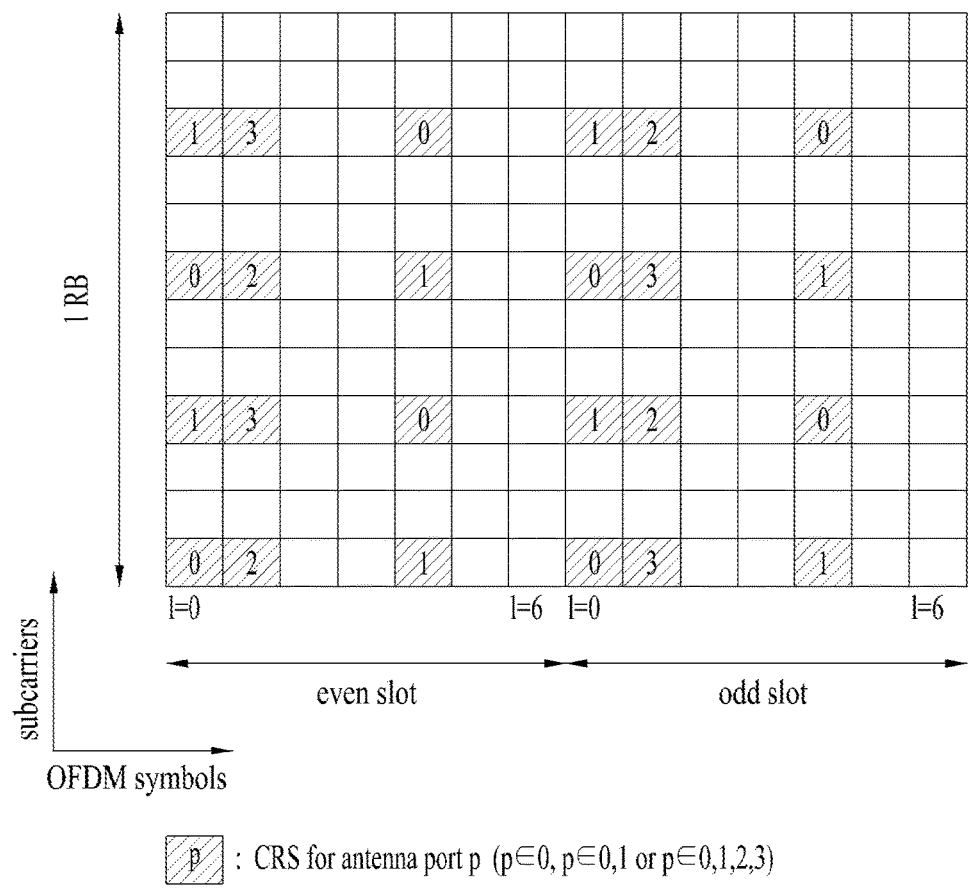
FIG. 12 illustrates an exemplary subframe to which Cell Specific Reference Signals (CRSs) are allocated.

FIG. 12 illustrates a subframe to which Cell-specific Reference Signals (CRSs) are allocated, which may be used in embodiments of the present disclosure.

FIG. 12 represents an allocation structure of the CRS in case of the system supporting 4 antennas. Since CRSs are used for both demodulation and measurement, the CRSs are transmitted in all DL subframes in a cell supporting PDSCH transmission and are transmitted through all antenna ports configured at an eNB.

More specifically, CRS sequence is mapped to complex-modulation symbols used as reference symbols for antenna port p in slot ns.

A UE may measure CSI using the CRSs and demodulate a signal received on a PDSCH in a subframe including the CRSs. That is, the eNB transmits the CRSs at predetermined locations in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE.

When the PDSCH is transmitted based on the CRSs, since the eNB should transmit the CRSs in all RBs, unnecessary RS overhead occurs. To solve such a problem, in a 3GPP LTE-A system, a UE-specific RS (hereinafter, UE-RS) and a CSI-RS are further defined in addition to a CRS. The UE-RS is used for demodulation and the CSI-RS is used to derive CSI. The UE-RS is one type of a DRS.

Since the UE-RS and the CRS may be used for demodulation, the UE-RS and the CRS can be regarded as demodulation RSs in terms of usage. Since the CSI-RS and the CRS are used for channel measurement or channel estimation, the CSI-RS and the CRS can be regarded as measurement RSs.

[[For details of the CRS which have not been described in the present disclosure, refer to Clause 6.10.1 of 3GPP TS 36.211.]]

1.6. Positioning Reference Signal (PRS)

Figure 13:
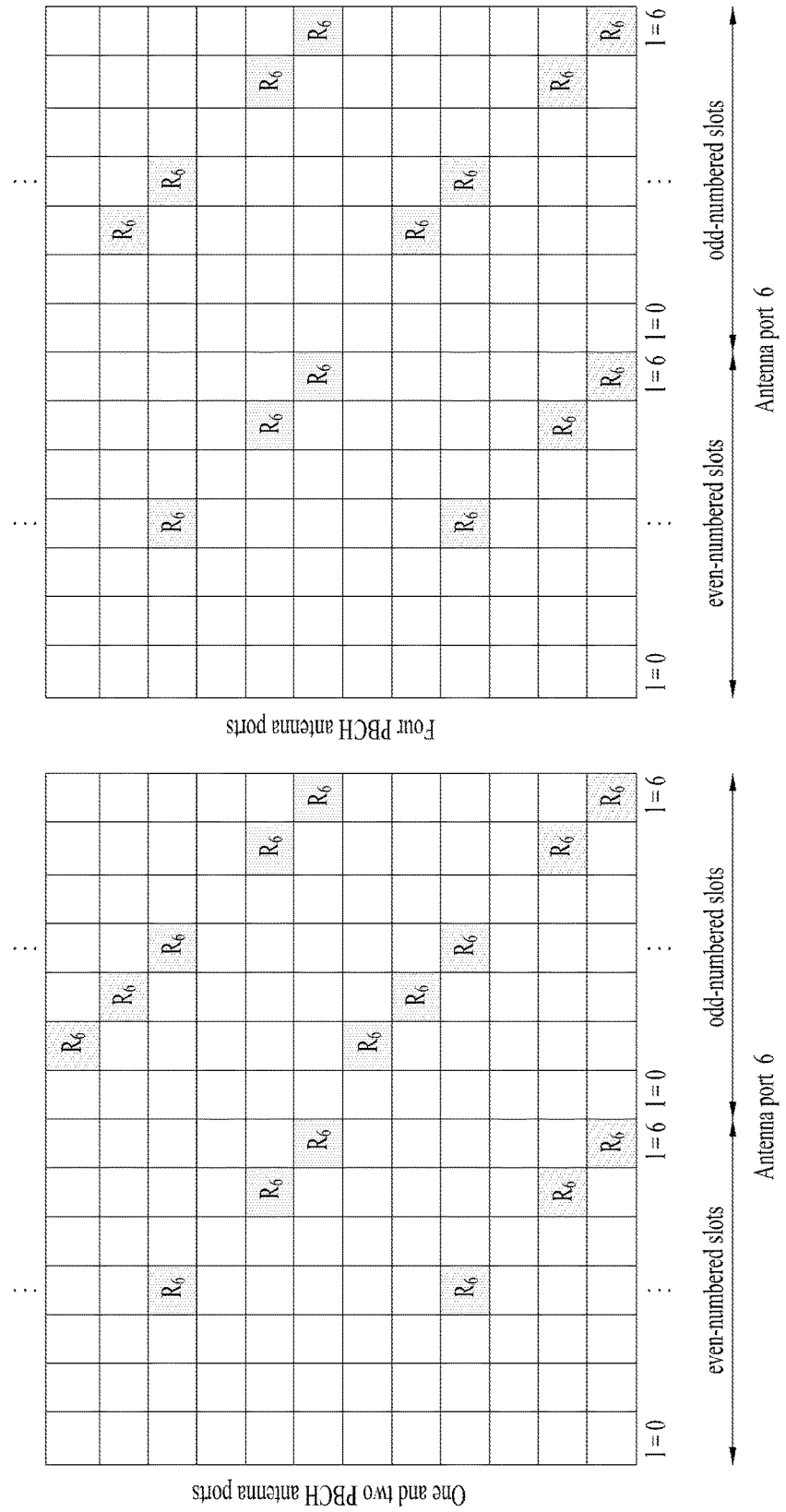
FIG. 13 is a view illustrating an exemplary Positioning Reference Signal (PRS) mapping pattern in a normal Cyclic Prefix (CP) case.

FIG. 13 is a view illustrating an exemplary PRS mapping pattern in a normal CP case.

Referring to FIG. 13, a PRS is transmitted through antenna port 6. The PRS is not mapped to REs to which a Physical Broadcast Channel (PBCH) and synchronization signals are allocated. Further, the PRS may be defined only when a subcarrier spacing $\Delta f$ is 15 kHz.

For details of the PRS, refer to Clause 6.10.4 of 3GPP TS 36.211. That is, for details of the PRS which are not specified in the embodiments of the present disclosure, the description of Clause 6.10.4 of 3GPP TS 36.211 may be applied.

The PRS may be used to estimate the location of a UE. In general, the PRS may be transmitted in a specific Subframe (SF). The specific SF may be one of a normal SF and/or a Multimedia Broadcast multicast service Single Frequency Network (MBSFN) SF.

In the case of a normal SF, an eNB transmits a CRS to a UE across the normal SF in a given CRS pattern. On the other hand, in the case of an MBSFN SF, a normal SF and an MBSFN SF may be multiplexed in Time Division Multiplexing (TDM) on an SF basis, or all SFs may be configured as MBSFN SFs (dedicated MBSFN SFs) in a corresponding carrier.

If normal SFs and MBSFN SFs are multiplexed in TDM in one frame, the eNB transmits the CRS to the UE only in a part of each MBSFN SF. Herein, the CRS is transmitted in a PDCCH region of the MBSFN SF, with no CRS in a data region of the MBSFN SF. This is because the MBSFN SF is configured for a special usage by the eNB and thus there is no need for channel quality measurement and channel state estimation through the CRS in the MBSFN SF. The first 2 OFDM symbols of the MBSFN SF may be allocated as the PDCCH region.

For SF scheduling to estimate the location of a UE, the PRS needs to be transmitted. If the PRS is transmitted in a normal SF, the CRS used for channel estimation or channel state measurement may interfere with the PRS. The CRS is a cell-specific reference signal that should be transmitted to all UEs.

On the other hand, if the PRS is transmitted in an MBSFN SF, the CRS interferes less with the PRS because only a part of the MBSFN SF carries the CRS. Further, since no CRS is transmitted in the data region of the MBSFN SF, the problem that a signal is not received from an adjacent cell due to a strong signal received from a serving cell, called a hearability problem may be overcome. The hearability problem arises when an Analog-to-Digital Converter (ADC) level is determined based on a serving cell, signals from neighbor cells are received at levels lower than the ADC level, and thus it is impossible to distinguish signals from each other.

Figure 14:
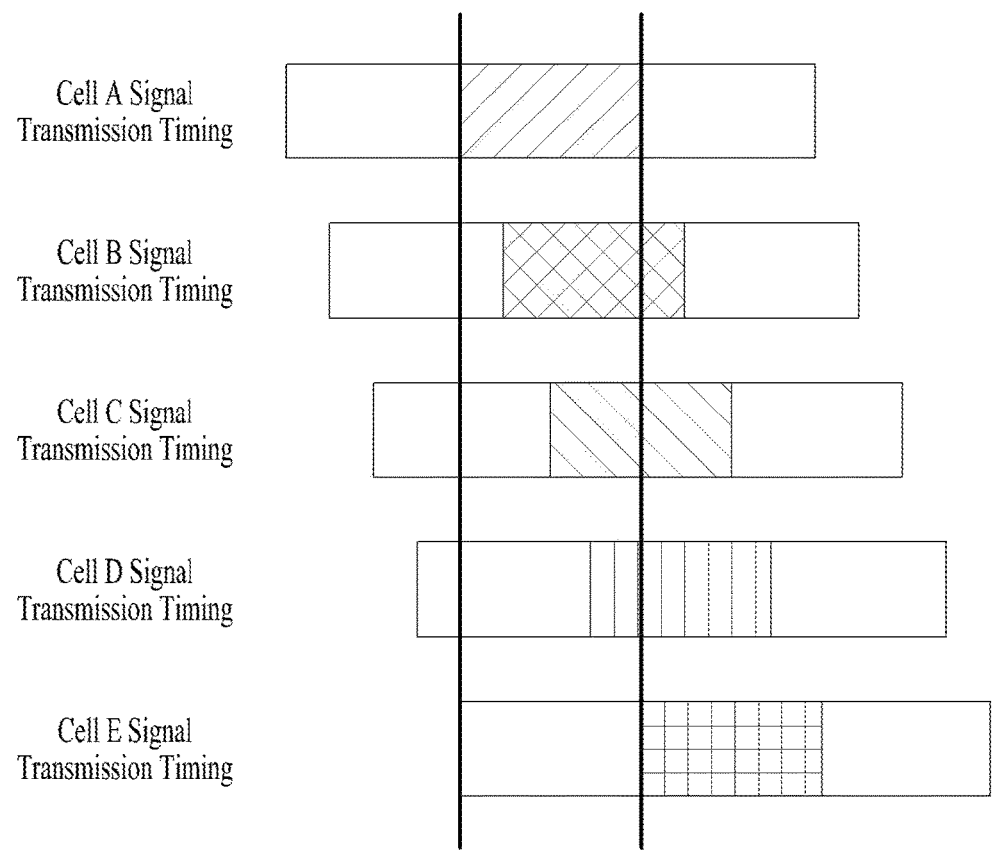
FIG. 14 is a view illustrating partial alignment between positioning subframes transmitted by a plurality of cells.

FIG. 14 is a view illustrating partial alignment between positioning SFs transmitted by a plurality of cells.

A SF configured to carry the PRS may be referred to as a positioning SF. To prevent time delay of processing PRSs transmitted by a plurality of cells, positioning SFs need to be aligned wholly or partially.

Thus, a UE may process the PRSs transmitted by the plurality of cells at the same time point, so that the PRSs may be used in estimating the location of the UE. However, since a specific SF of a radio frame may not be configured as an MBSFN SF, it may not be possible to wholly or partially align positioning SFs transmitted by a plurality of cells. As a result, if the PRS is transmitted in an MBSFN SF, not a normal SF, the performance of estimating the location of a UE may be degraded.

As described above, a PRS transmitted in a normal SF and a PRS transmitted in an MBSFN subframe are in trade-off with each other in terms of estimation performance and configuration flexibility. Therefore, the PRS needs to be transmitted in both the normal SF and the MBSFN SF, not in only one of the SFs.

The normal SF and the MBSFN SF differ in CRS patterns. Accordingly, two PRS patterns need to be configured separately for the normal SF and the MBSFN SF.

2. Positioning Service

The positioning service is a service of providing the geographical location of a UE. For this purpose, the LTE system defines a protocol between a UE and a location information server to support positioning of the UE.

Figure 15:
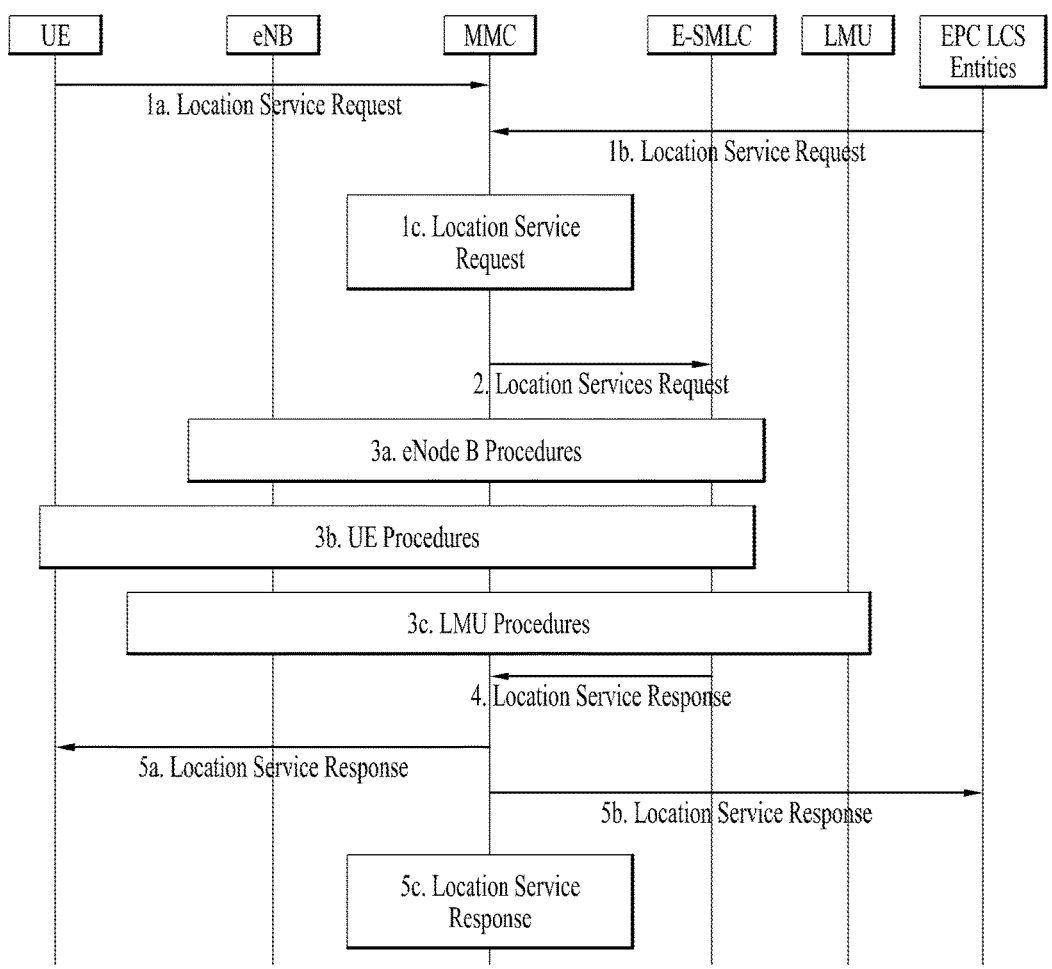
FIG. 15 is a diagram illustrating a signal flow for a positioning service providing procedure.

FIG. 15 is a diagram illustrating a signal flow for a positioning service providing procedure.

Positioning service-related supports will be described with reference to FIG. 15. Referring to FIG. 15, the positioning service may be initiated by requesting the positioning service to an MME by a UE (1a.), requesting the positioning service for the specific UE to the MME by a specific entity (e.g., Gateway Mobile Location Center (GMLC)) of an Enhanced packet Core (EPC) (1b.), or determining to provide the positioning service to the specific UE by a serving MME due to an emergency call or the like (1c.).

After the above initiation operation, the MME transmits a location/positioning service request message to an Evolved Serving Mobile Location Center (E-SMLC) (2.).

Upon receipt of the location/positioning service request message, the E-SMLC initiates a positioning service-related procedure with a serving eNB of the UE in order to acquire a location measurement or support data (e.g., assistance data) for supporting the positioning service (3a.).

Additionally or alternatively to the procedure initiation, the E-SLMC may initiate a direct location measurement procedure with the UE (3b.).

For the positioning service using a UL, the UE may initiate a positioning service procedure with a Location Measurement Unit (LMU) of the corresponding UE along with the eNB in addition to initiation of the positioning service (3c.).

The E-SMLC transmits a location/positioning service response message for the UE to the MME based on the acquired positioning service-related measurement (4.).

Subsequently, the MME provides positioning service response information to the UE, to the specific entity of the EPC, or the GMLC that has requested a related emergency all (5a., 5b., or 5c.).

Figure 16:
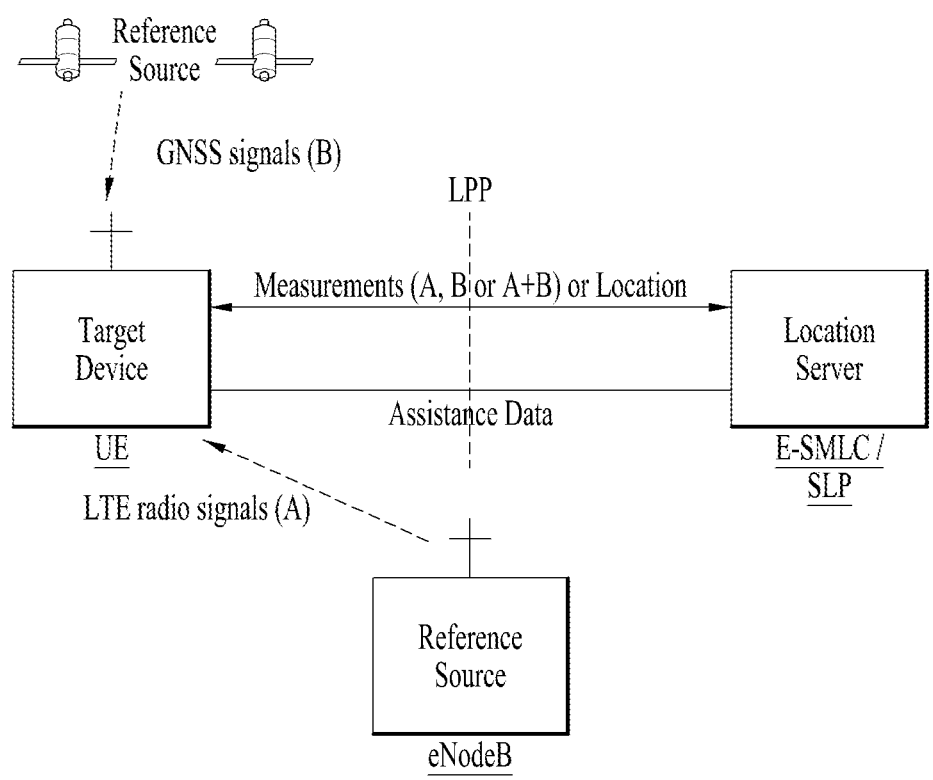
FIG. 16 is a conceptual diagram illustrating an LTE positioning protocol provided by a Long Term Evolution (LTE) system.

FIG. 16 is a conceptual diagram illustrating an LTE Positioning Protocol (LPP) provided by an LTE system.

The LPP may be defined between a location server (e.g., an E-SMLC/SLP) for providing a location service, a target UE whose location is to be measured, and an eNB and/or a satellite that provides reference resources for location measurement.

Referring to FIG. 16, a target device (i.e., UE) receives an LTE radio signal (A) from an eNode B, and a GNSS signal (B) from a satellite. The target device may also receive assistance data from a location server, for use in location measurement, and may perform location measurement.

The UE may transmit the measured A, B, or A and B to the location server, or may transmit location information estimated by the UE to the location server. Herein, a CRS and/or a PRS may be used as the LTE radio signal (A).

2.1 PRS Subframe

To support measurement of a UE for the positioning service, an eNB transmits a PRS through antenna port 6. For the PRS, refer to FIG. 13 and its description.

An SF carrying the PRS (i.e., a PRS SF) uses a different CP length according to a PRS SF configuration. For example, if a normal SF and an MBSFN subframe are configured as PRS subframes, an OFDM symbol carrying the PRS in the MBSFN SF is configured to use a CP used in SF #0 of a frame including the MBSFN SF. If PRS SFs are configured only as MBSFN SFs, an OFDM symbol carrying the PRS in an MBSFN SF is configured to always use an extended CP.

It is assumed that the UE is set to Transmission Mode (TM) 9 or TM 10. Herein, if a higher layer transmits a PMCH in an SF configured as an MBSFN SF or a PRS SF uses a different CP length from SF #0, the UE may be configured not to decode a PDSCH corresponding to control information delivered on a PDCCH scrambled with a C-RNTI or an SPS C-RNTI.

More specifically, if the UE is set to TM 9 or TM 10, a PRS transmitted in an MBSFN SF is configured to use an extended CP. Meanwhile, if a PDSCH is transmitted in an MBSFN SF, the MBSFN SF is configured to use the CP length of SF #0 of a frame including the MBSFN SF. If SF #0 adopts a normal CP, not an extended CP, it is ambiguous whether the MBSFN SF should use the extended CP, or the normal CP like SF #0.

Therefore, the UE may be configured not to decode a PDSCH corresponding to control information delivered on a PDCCH scrambled with a C-RNTI or an SPS C-RNTI.

3. Method for Transmitting PRS and Data to MTC UE

Now, a description will be given of methods for transmitting and receiving a PRS for measuring the location of an MTC UE, and methods for repeatedly transmitting a PDSCH during PRS transmission and reception.

3.1 MTC UE

For an LTE-A system (beyond Rel-12) as a future-generation wireless communication system, it is under consideration to configure low-price/low-specification terminals that conduct mainly data communication such as metering, water level measurement, use of a surveillance camera, and stock reporting of a vendor machine. In embodiments of the present disclosure, such terminals will be referred to as MTC UEs.

MTC is a scheme of conducting communication between devices without human intervention. Smart metering may be considered to be a major application of MTC. Smart metering is an application technology of attaching a communication module to a metering device for measurement of electricity, gas, water, and so on, and transmitting measurement information periodically to a central control center or a data collection center.

Further, since MTC UEs are supposed to be produced and distributed at low prices, the MTC UEs may be designed to support only a very narrow band (e.g., equal to or less than 1RB, 2RBs, 3RBs, 4RBs, 5RBs, or 6RBs), compared to a general cellular system. In this case, an MTC UE is not capable of decoding a DL control channel region transmitted across a total system band as is done in the general cellular system, and control information for the MTC UE may not be transmitted in the DL control channel region. That is why the amount of control information for an MTC UE is decreased and the amount of resources for data transmission to the MTC UE is also decreased.

An MTC UE used for smart metering may have difficulty in communicating with an eNB because the MTC UE is highly likely to be installed in a shadowing area such as a basement. Accordingly, data needs to be transmitted repeatedly on a DL channel and/or a UL channel to overcome the difficulty. For example, the PDCCH/EPDCCH, PDSCH, PUSCH, and PUCCH may all be transmitted repeatedly.

To realize low-price MTC UEs, the bandwidth of the MTC UEs may be limited. That is, although a system bandwidth is 10 MHz, an MTC UE may transmit and receive signals only in 1.4 MHz. The present disclosure proposes a method for transmitting and receiving a PRS in a PRS SF, a method for transmitting and receiving a PDSCH, and an operation of an MTC UE. Unless otherwise specified, the following embodiments of the present disclosure may be implemented based on the descriptions of Clause 1 and Clause 2.

3.2 Method for Transmitting PDSCH Repeatedly to MTC UE

A method for repeatedly transmitting a PDSCH to an MTC UE in an MBSFN SF will be described below 3.2.1 PDSCH Repeated Transmission Method-1

An MBSFN SF may be configured not to deliver a repeatedly transmitted PDSCH.

A CRS is transmitted only in an OFDM symbol carrying a PDCCH in the MBSFN SF. Therefore, in a transmission mode requiring CRS-based PDSCH decoding (e.g., TM 1 to TM 6), the number of CRSs available for PDSCH decoding is decreased in the MBSFN SF.

Therefore, an eNB may not transmit a PDSCH repeatedly in MBSFN SFs. In other words, the eNB may transmit a PDSCH repeatedly to an MTC UE only in normal SFs.

When the PDSCH is transmitted repeatedly, the Redundancy Version (RV) of the PDSCH may be changed in a predetermined order at each PDSCH transmission. In this case, RVs may be set as illustrated in FIG. 17.

FIG. 17 is a view illustrating a method for setting RVs, when a PDSCH is repeatedly transmitted to an MTC UE.

It is assumed in FIG. 17 that a PDSCH is transmitted repeatedly N times (at least two times) to an MTC UE, and PRS SFs are configured with a normal SF and an MBSFN SF, or only MBSFN SFs.

FIG. 17(a) illustrates a method for transmitting a PDSCH with an RV next to a PDSCH with an RV transmitted in a normal SF immediately previous to an MBSFN SF. For example, it is assumed that the transmission order of RVs is RV0, RV2, RV3, RV1, RV0, RV2, . . . . Referring to FIG. 17(a), if an eNB transmits a PDSCH corresponding to RV3 in a normal SF immediately previous to an MBSFN SF and does not transmit the PDSCH in the MBSFN SF, the eNB may be configured to transmit RV1 in the first normal SF next to the MBSFN SF.

That is, the eNB and/or the MTC UE counts RVs of a PDSCH transmitted in normal SFs, and does not count RVs in MBSFN SFs. This method is intended to increase PDSCH transmission efficiency by transmitting all RVs as fast as possible.

FIG. 17(b) illustrates an RV counting method on the assumption that a PDSCH is transmitted in MBSFN SFs, even though the PDSCH is not actually transmitted repeatedly in the MBSFN SFs. Referring to FIG. 17(b), the eNB transmits a PDSCH corresponding to RV3 in a normal SF immediately previous to an MBSFN SF. Subsequently, if the PDSCH is not transmitted in MBSFN SFs (on the assumption that the length of the MBSFN SFs is set to 3 SFs), the eNB transmits the PDSCH corresponding to RV3 in the first normal SF after the MBSFN SFs.

That is, the eNB and/or the MTC UE may count RVs continuously, assuming that a PDSCH is transmitted in an MBSFN SF as well as in a normal SF. This method seeks to minimize the influence of an error, when the error occurs to information about an MBSFN SF transmitted to a UE.

FIG. 17(c) illustrates a method for transmitting a PDSCH repeatedly, when the PDSCH is repeatedly transmitted to an MTC UE and the repeated PDSCHs have the same RV. For example, if the total repetition number of a PDSCH is N, a PDSCH having the same RV may be repeated X times. In FIG. 17(c), if the PDSCH occurs repeatedly six times in total, a PDSCH of RV2 may be transmitted three times, and then a PDSCH of RV3 may be transmitted three times. However, FIG. 17(c) is based on the assumption that a PDSCH is not transmitted repeatedly in MBSFN SFs. Because the PDSCH is not transmitted repeatedly in the MBSFN SFs, the PDSCH is transmitted in normal SFs immediately next to the MBSFN SFs as many times as the remaining repletion number. In FIG. 17(c), since the PDSCH of RV2 is transmitted twice before the MBSFN SFs, the PDSCH of RV2 is transmitted once more after the MBSFN SFs.

The method illustrated in FIG. 17(b) may be applied to the illustrated case of FIG. 17(c). For example, although a PDSCH is not transmitted actually in MBSFN SFs, an RV may be counted in each of the MBSFN SFs as if the PDSCH were transmitted in the MBSFN SFs. In this case, the PDSCH of RV3 may be transmitted once in the normal SFs immediately next to the MBSFN SFs.

3.2.2 PDSCH Repeated Transmission Method-2

Methods for allowing PDSCH repeated transmissions in MBSFN SFs will be described below.

If a PDSCH is transmitted repeatedly in MBSFN SFs, the PDSCH may be decoded using DM-RSs. That is, if the PDSCH is transmitted repeatedly, the MTC UE may decode the PDSCH using CRSs in normal SFs and using DM-RSs in MBSFN SFs. As the PDSCH is also transmitted repeatedly in the MBSFN SFs, a DL time period required for PDSCH repeated transmissions may be minimized, thereby reducing the power consumption of the MTC UE.

Or, a new RS may be defined for MTC PDSCH decoding, so that repeatedly transmitted PDSCHs may be decoded using the new RS without the need for distinguishing normal SFs from MBSFN SFs.

3.3 Method for Transmitting PRS to MTC UE

As described before, the CP length of an OFDM symbol carrying a PRS in PRS SFs may be determined according to a configuration scheme for the PRS SFs. For example, if the PRS SFs are configured with a normal SF and an MBSFN SF, a normal CP may be used, whereas if the PRS SFs are configured with only MBSFN SFs, an extended CP may be used.

A UE assumes that no PDSCH repeated transmission takes place in PRS SFs of a serving cell. For this purpose, an eNB may transmit information about PRS SFs to the MTC UE irrespective of whether positioning capability is supported or not. The PRS SF information may include information about the indexes of the PRS SFs, a PRS transmission period, and/or a PRS transmission pattern. Further, the PRS SF information may be transmitted by an SIB, higher layer signaling (MAC, RRC, or the like), or an (E)PDCCH.

More strictly, it may be assumed that if at least one of the following conditions is satisfied, no PDSCH repeated transmission takes place.

(1) Condition 1: the PRS is transmitted only in MBSFN SFs.

(2) Condition 2: the PRS is transmitted only in MBSFN SFs, and PDSCH repeated transmissions are decoded using DM-RSs.

(3) Condition 3: the PRS is transmitted in a normal SF and an MBSFN SF, and PDSCH repeated transmissions are decoded using DM-RSs.

In another aspect of the embodiment, the eNB may not provide the PRS SF information to the MTC UE. If no PDSCH repeated transmission is performed in PRS SFs, the UE may attempt decoding on the assumption of PDSCH repeated transmissions, thereby degrading the performance of PDSCH repeated transmissions. However, since a PRS transmission period is relatively long, such as 160 ms, 320 ms, 640 ms, or 1280 ms, the performance of PDSCH repeated transmissions may not be affected relatively much.

In this case, even though a PDSCH is not transmitted repeatedly in a PRS SF, the RV of the first SF carrying the PDSCH after the PRS SF is preferably set on the assumption that the PDSCH is transmitted in the PRS SF (this may be applied in a similar manner to the method described before with reference to FIG. 17(b)). This is because the MTC UE assumes transmission of a PDSCH in a PRS SF, and thus if the MTS UE's assumption is not considered in setting an RV, an HARQ buffer corruption occurs, thereby degrading HARQ performance.

Meanwhile, if the PRS is configured to be transmitted in a normal SF and an MBSFN SF, it may be assumed that a PDSCH is transmitted repeatedly in the normal SF being a PRS SF. Herein, the MTC UE may decode the PDSCH repeated transmission using a CRS. For this purpose, the eNB may transmit information about the PRS SFs to the MTC UE irrespective of whether positioning capability is supported or not.

A PRS is transmitted in SFs in which a PDSCH is transmitted repeatedly in the following methods.

(1) Method 1: the eNB may allocate a PDSCH to be repeatedly transmitted to SFs, puncture REs corresponding to a PRS pattern, and transmit the PRS in the punctured REs to the MTC UE. This is a PRS transmission method available when information about PRS SFs is not provided to the MTC UE. However, since the PRS is transmitted in 14 or 16 REs in one PRB pair, the performance of PDSCH repeated transmissions may be degraded.

(2) Method 2: the eNB may map PDSCH repeated transmissions to REs other than PRS REs. This method is efficient when the eNB provides PRS SF information to the MTC UE. The PRS SF information may be transmitted by an SIB, higher-layer signaling (MAC, RRC, or the like), or an (E)PDCCH.

(3) Method 3: the eNB may not transmit the PRS only in PRBs in which PDSCH repeated transmissions take place (e.g., 6 RBs for MTC PDSCH transmission). If a system bandwidth is large relative to a reception bandwidth of the MTC UE, the degradation of PRS detection performance caused by a non-PRS transmission band may not be significant.

Figure 18:
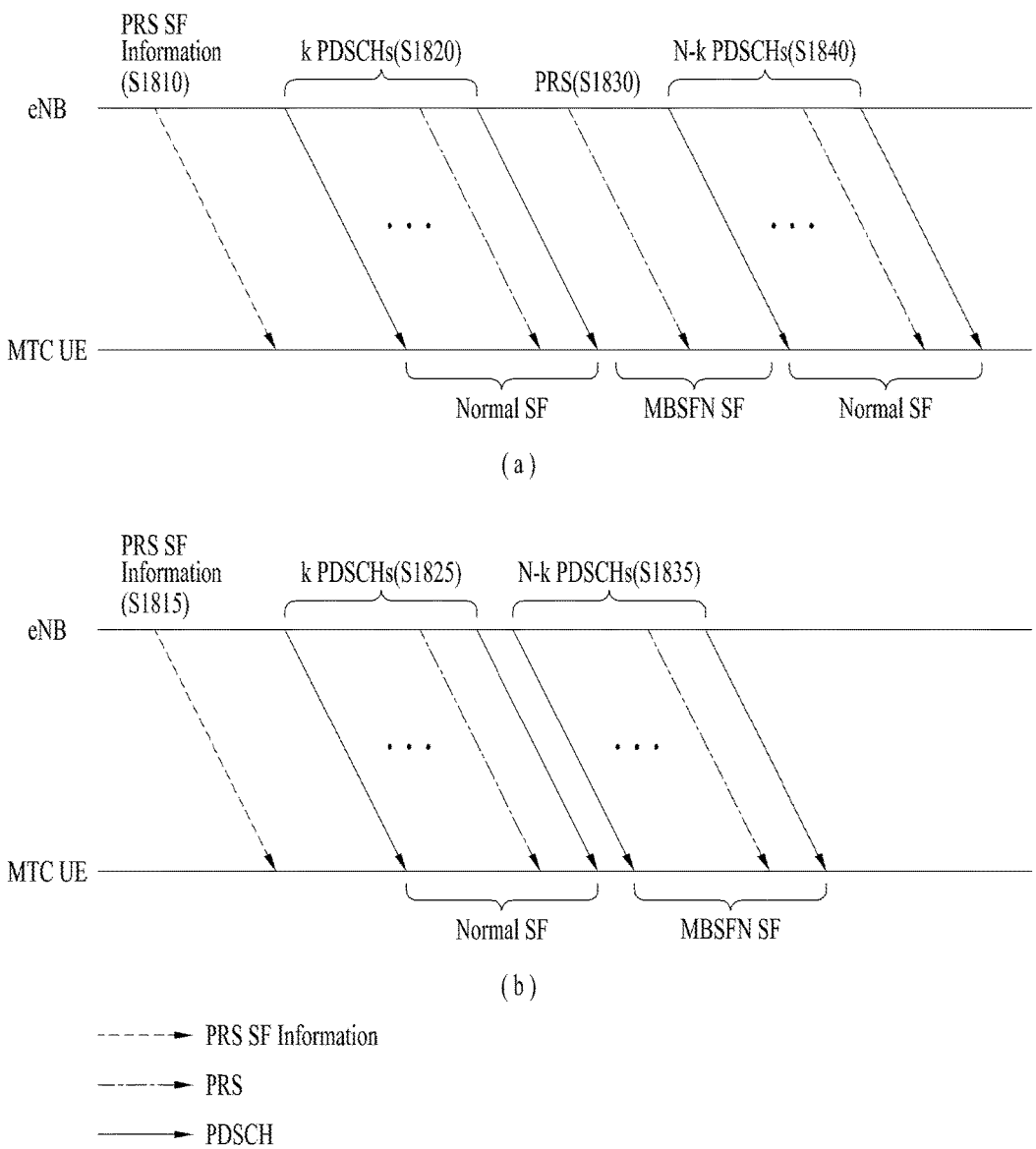
FIG. 18 is a view illustrating methods for transmitting a PRS and a PDSCH.

FIG. 18 is a view illustrating methods for transmitting a PRS and a PDSCH.

FIG. 18 is intended to describe the foregoing embodiments of the present disclosure, and the descriptions of Clause 1 to Clause 3 are applicable to FIG. 18. FIG. 18(a) illustrates operations of an eNB and a UE, in the case where a PDSCH directed to the MTC UE is not transmitted repeatedly in MBSFN SFs, and FIG. 18(b) illustrates operations of an eNB and a UE, in the case where a PDSCH directed to the MTC UE is transmitted repeatedly even in MBSFN SFs.

Referring to FIG. 18(a), the eNB may transmit PRS SF information to the MTC UE by higher-layer signaling (S1810).

The eNB may transmit a PDSCH repeatedly N times to the MTC UE. For example, the eNB may repeatedly transmit the PDSCH k times, discontinue the PDSCH repeated transmissions in MBSFN SFs, and then repeatedly transmit the PDSCH the remaining (N−k) times to the MTC UE (S1820, S1840).

During the N transmissions of the PDSCH, the eNB may transmit the PRS to the MTC UE in PRS SFs indicated by the PRS SF information transmitted to the MTC UE in step S1810. If an MBSFN SF is configured as a PRS SF, the PRS may be transmitted in the MBSFN SF (S1830).

Referring to FIG. 18(b), the eNB may transmit PRS SF information to the MTC UE by higher-layer signaling (S1815).

The eNB may repeatedly transmit a PDSCH N times in total to the MTC UE. For example, the eNB may transmit the PDSCH k times repeatedly, and then the remaining (N−k) times of the PDSCH transmissions in MBSFN SFs (S1825, S1835).

During the N transmissions of the PDSCH, the eNB may transmit the PRS to the MTC UE in PRS SFs indicated by the PRS SF information transmitted to the MTC UE in step S1815. If an MBSFN SF is configured as a PRS SF, the PRS may be transmitted in the MBSFN SF.

With reference to FIG. 18, a case in which the PRS is transmitted in both a normal SF and an MBSFN SF, that is, PRS SFs include a normal SF and an MBSFN SF has been described. However, the PRS SFs may include only MBSFN SFs according to a system configuration. In this case, the PRS for the MTC UE is not transmitted in a normal SF. It may be configured that if the PRS SFs include a normal SF and an MBSFN SF, they use a normal CP, whereas if the PRS SFs include only MBSFN SFs, they use an extended CP.

In FIG. 18, steps S1810 and S1815 may be optional. Further, for the PRS transmission method of FIG. 18, Clause 3.3 may be referred to. The description of Clause 3.2 may be applied to setting of RVs to a repeatedly transmitted PDSCH in FIG. 18.

The embodiments of the present disclosure have been described on the assumption that a PDSCH is transmitted repeatedly on a subframe basis. However, the PDSCH repeated transmissions may take place on a frame basis, a slot basis, or an OFDM symbol basis, and the foregoing embodiments may be applied in the same manner except that the unit is changed.

3.4 Method for Transmitting PRS to Fixed MTC UE

An MTC UE may be deployed fixedly at a specific location. Since the geographical location of the MTC UE is fixed, there may be no need for determining the location of the MTC UE often or periodically. Accordingly, only when it is necessary to locate the MTC UE, an eNB may transmit a PRS to the MTC UE.

For this purpose, the eNB may transmit PRS SF information to the MTC UE by higher-layer signaling, an SIB, or the like, and may transmit the PRS in SFs indicated by the PRS SF information to the MTC UE. The MTC UE may perform a measurement procedure required for the positioning service in the SFs indicated by the PRS SF information, and transmit the measurement result to the eNB.

In the embodiments of the present disclosure described in Clause 3.1 to Clause 3.4, SFs carrying a PDSCH may be configured as valid SFs. That is, it may be configured that the PDSCH is repeatedly transmitted only in the valid SFs, not transmitted in SFs other than the valid SFs. For example, the MTC UE may not consider MBSFN SFs or PRS SFs to be valid SFs or may exclude the MBSFN SFs or PRS SFs from valid SFs. Therefore, SFs in which the PDSCH is transmitted repeatedly may be configured as valid SFs in the embodiments of the present disclosure.

4. Apparatuses

Figure 19:
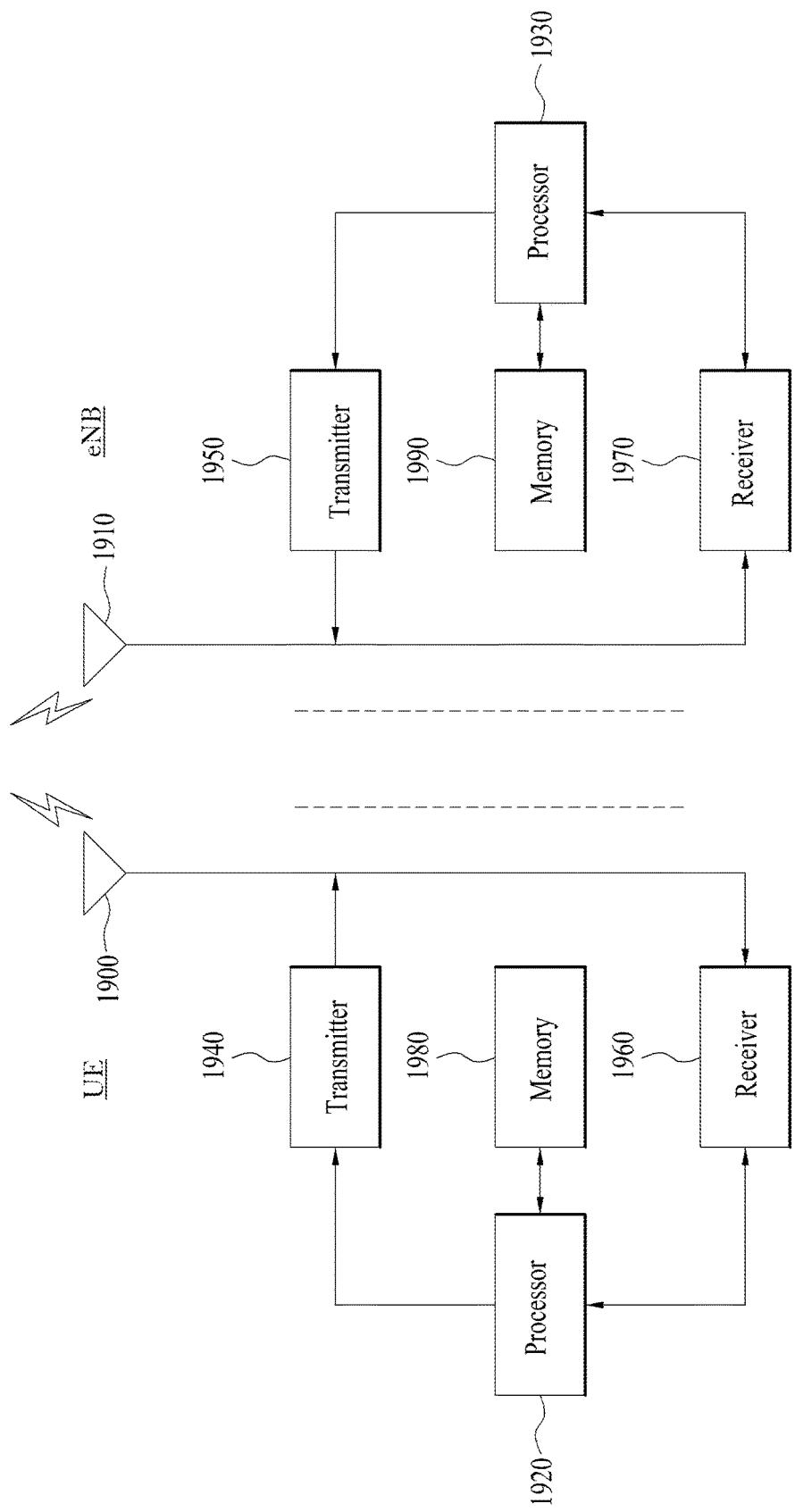
FIG. 19 is a block diagram of apparatuses for performing the methods illustrated in FIGS. 1 to 18.

Apparatuses illustrated in FIG. 19 are means that can implement the methods described before with reference to FIGS. 1 to 18.

A UE may act as a transmission end on a UL and as a reception end on a DL. An eNB may act as a reception end on a UL and as a transmission end on a DL.

That is, each of the UE and the eNB may include a Transmitter (Tx) 1940 or 1950 and a Receiver (Rx) 1960 or 1970, for controlling transmission and reception of information, data, and/or messages, and an antenna 1900 or 1910 for transmitting and receiving information, data, and/or messages.

Each of the UE and the eNB may further include a processor 1920 or 1930 for implementing the afore-described embodiments of the present disclosure and a memory 1980 or 1990 for temporarily or permanently storing operations of the processor 1920 or 1930.

The embodiments of the present disclosure may be performed using the foregoing components and functions of a UE and an eNB. For example, the processor of the eNB may configure PRS SF information and transmit the PRS SF information to an MTC UE by controlling a transmitter, and support N PDSCH repeated transmissions. For RV setting of the N PDSCH repeated transmissions, refer to Clause 3.2.

The processor of the MTC UE may receive a PRS in SFs indicated by the PRS SF information, measure location information about the MTC UE, and report the location information to the eNB. Further, the processor of the MTC UE may receive the repeatedly transmitted PDSCHs by controlling the receiver, and according to a configuration, may or may not receive a PDSCH in an MBSFN SF.

PDSCH repeated transmissions and PRS transmission may be performed according to Clause 1 to Clause 3.

The Tx and Rx of the UE and the eNB may perform a packet modulation/demodulation function for data transmission, a high-speed packet channel coding function, OFDM packet scheduling, TDD packet scheduling, and/or channelization. Each of the UE and the eNB of FIG. 19 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 1980 or 1990 and executed by the processor 1920 or 1930. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

The invention claimed is:

1. A method for transmitting a Positioning Reference Signal (PRS) for estimating a location of a Machine Type Communication (MTC) User Equipment (UE) by a Base Station (BS) in a wireless access system supporting MTC, the method comprising:
   transmitting PRS Subframe (SF) information;
   repeatedly transmitting a Physical Downlink Shared Channel (PDSCH) including a same downlink data, N times; and
   transmitting the PRS in PRS SFs, wherein a normal Cyclic Prefix (CP) is applied to the PRS when the PRS SFs are configured with a normal SF and a Multimedia Broadcast Multicast Service Single Frequency Network (MBSFN) SF, wherein an extended CP is applied to the PRS when the PRS SFs are configured with only MBSFN SFs, and wherein the PRS SF information indicates SFs configured as the PRS SFs.

2. The method according to claim 1, wherein the repeatedly transmitted PDSCH is not transmitted in the MBSFN SF.

3. The method according to claim 2, wherein a Redundancy Version (RV) of the PDSCH transmitted repeatedly N times is not counted for the MBSFN SF, if the PDSCH is not transmitted in the MBSFN SF.

4. The method according to claim 2, wherein a redundancy value (RV) of the PDSCH transmitted repeatedly N times is counted, on the assumption that the PDSCH is transmitted in the MBSFN SF.

5. The method according to claim 1, wherein if some of the N transmitted PDSCHs are transmitted in the MBSFN SF, the some of the N transmitted PDSCHs are transmitted based on a Demodulation Reference Signal (DM-RS) specific to the MTC UE, and ones of the N transmitted PDSCHs that are transmitted in the normal SF are transmitted based on a Cell-specific Reference Signal (CRS) specific to the BS.

6. A Base Station (BS) for transmitting a Positioning Reference Signal (PRS) for estimating a location of a Machine Type Communication (MTC) User Equipment (UE) in a wireless access system supporting MTC, the BS comprising:

a transmitter; and a processor configured to support PRS transmission by controlling the transmitter, wherein the processor is configured to transmit PRS Subframe (SF) information, repeatedly transmit a Physical Downlink Shared Channel (PDSCH) including a same downlink data, N times, and transmit the PRS in PRS SFs, wherein a normal Cyclic Prefix (CP) is applied to the PRS when the PRS SFs are configured with a normal SF and a Multimedia Broadcast Multicast Service Single Frequency Network (MBSFN) SF, wherein an extended CP is applied to the PRS when the PRS SFs include only MBSFN SFs, and wherein the PRS SF information indicates SFs configured as the PRS SFs.

7. The BS according to claim 6, wherein the repeatedly transmitted PDSCH is not transmitted in the MBSFN SF.

8. The BS according to claim 7, wherein a Redundancy Version (RV) of the PDSCH transmitted repeatedly N times is not counted for the MBSFN SF, if the PDSCH is not transmitted in the MBSFN SF.

9. The BS according to claim 7, wherein a redundancy value (RV) of the PDSCH transmitted repeatedly N times is counted, on the assumption that the PDSCH is transmitted in the MBSFN SF.

10. The BS according to claim 6, wherein if some of the N transmitted PDSCHs are transmitted in the MBSFN SF, the some of the N transmitted PDSCHs are transmitted based on a Demodulation Reference Signal (DM-RS) specific to the MTC UE, and ones of the N transmitted PDSCHs that are transmitted in the normal SF is transmitted based on a Cell-specific Reference Signal (CRS) specific to the BS.

* * * * *